United States Patent Office 3,502,659
Patented Mar. 24, 1970

3,502,659
14α,15α-KETONIDES OF ALKYL 3-OXYGENATED-14α,15α-DIHYDROXY-4,17(20)-CIS-PREGNADIEN-21-OATES, DERIVATIVES THEREOF, AND INTERMEDIATES AND PROCESSES THEREFOR
Philip F. Beal III, Kalamazoo, and Robert W. Jackson, Portage, Mich., assignors to The Upjohn Company, Kalamazoo, Mich., a corporation of Delaware
No Drawing. Filed Apr. 3, 1967, Ser. No. 627,658
Int. Cl. C07c *173/00, 169/00*
U.S. Cl. 260—239.55    24 Claims

ABSTRACT OF THE DISCLOSURE

This invention relates to novel steroid compounds and processes for their preparation; more particularly to those compounds embraced by the formula

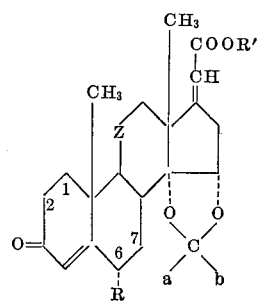

wherein the 1(2)-and 6(7)-carbon atom linkages are selected from the group consisting of single bonds and double bonds; R and R' are selected from the group consisting of hydrogen and lower alkyl; Z is selected from the group consisting of the methylene radical (>CH$_2$), the β-hydroxymethylene radical

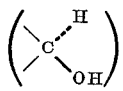

and the carbonyl radical (>C=O); a and b are selected from the group consisting of lower alkyl of from one through twelve carbon atoms, phenyl and benzyl. The compounds of the invention possess anti-inflammatory, anti-viral, anti-microbial, and antihormonal activities.

BRIEF SUMMARY OF INVENTION

The novel compounds of this invention and processes for their production are illustratively represented by the following sequence of formulae:

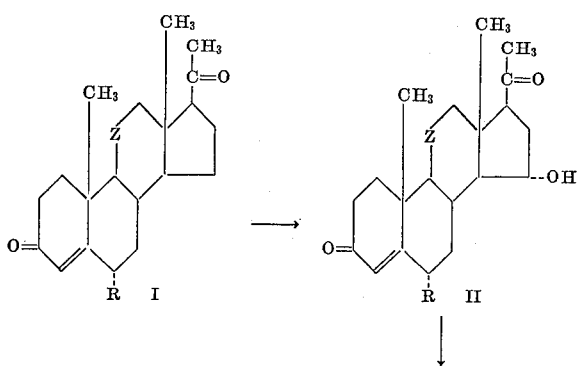

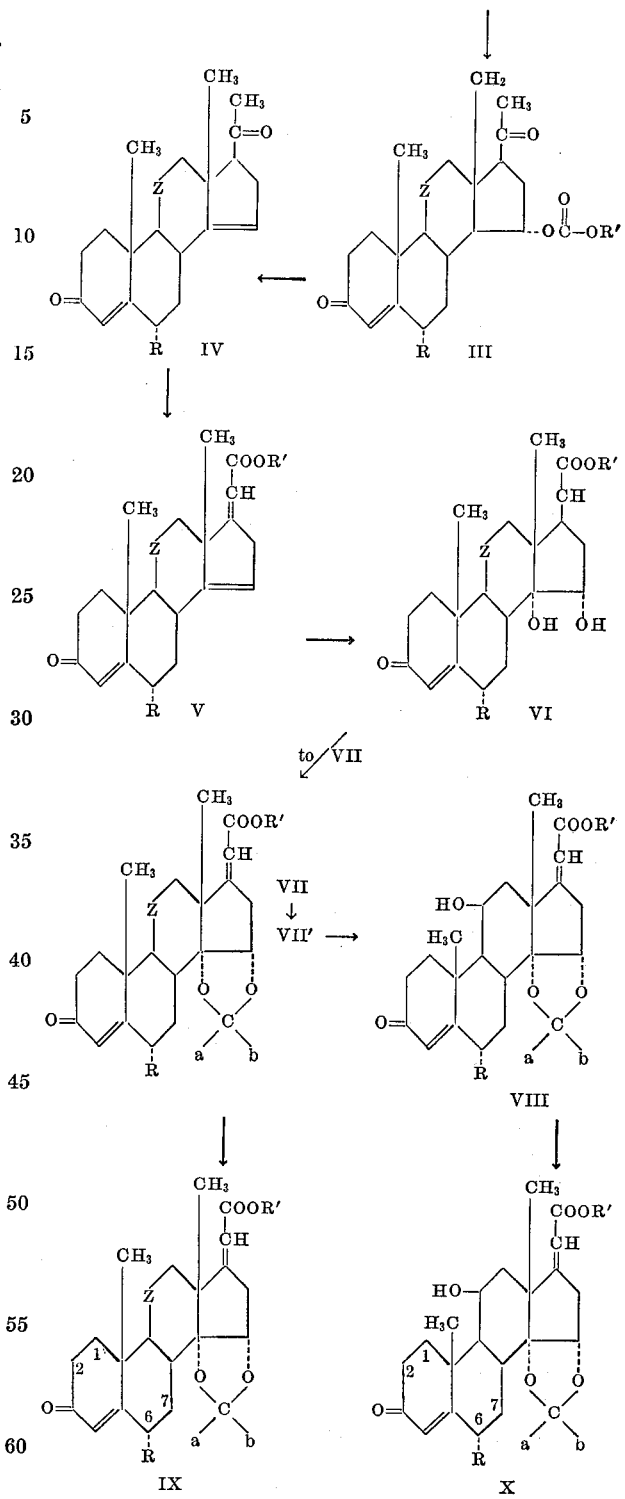

wherein Z is selected from the group consisting of the methylene and carbonyl radicals and 1(2), 6(7), a, b R and R' have the same meaning as above.

The novel compounds embraced by Formulae V through X of the flow-sheet, above, are prepared by the route shown therein, employing the methods and reactions described below.

(1) The first step of the process involves the 15α-hydroxylation of the known compounds of Formula I in accordance with the procedure disclosed in Preparation 1 of U.S. Patent 3,053,864, namely by fermenting a compound of the progesterone series, e.g., a Δ⁴-3,20-dione (or 3,11,20-trione) (I) with the spores of Penicillium urticae ATCC 10120 in a nutrient medium to yield a corresponding 15α-hydroxy compound, e.g., a 15α-hydroxy-Δ⁴-3,20-dione (or 3,11,20-trione) (II).

(2) Treatment of a thus produced compound of Formula II with an alkylhaloformate (e.g., methylchloroformate) at low temperatures (e.g., between about −20° C. to about +20° C.) yields a corresponding 15α-alkyl carbonate, e.g., a 15α-hydroxy-Δ⁴-3,20-dione (or 3,11,20-trione), 15-alkyl carbonate (III).

(3) Pyrolysis of a compound of Formula III (advantageously under vacuum at temperatures between about 200 to about 300° C.) results in its loss of COO and alkyl OH at the 15α-position to yield a corresponding 4,14-pregnadiene-3,20-dione (or 3,11,20-trione) (IV).

(4) A compound of Formula IV is subjected to Favorskii rearrangement in accordance with the method described in J. Amer. Chem. Soc 77, 4438 to yield a corresponding alkyl, 3-keto (or 3,11-diketo)-4,14,17(20)-cis-pregnatrien-21-oate (V).

(5) Treatment of a thus produced compound of Formula V at moderate (room) temperature with an oxidant, such as osmium tetroxide dissolved in an organic solvent such as ether, or potassium permanganate in weak acid solution (e.g., formic acid or acetic acid), yields a corresponding alkyl 3-keto (or 3,11-diketo)-14α,15α-dihydroxy-4,17(20)-cis-pregnadien-21-oate (VI).

(6) A compound of Formula VI on treatment in the manner described in J. Amer. Chem. Soc. 80, 2338, namely, at moderate (room) temperature with an aliphatic ketone (e.g., acetone diethyl ketone, dibutyl ketone, ethyloctyl ketone, 3,3-dimethyl-2-butanone, etc.) or an aromatic ketone (e.g., acetophenone, propiophenone, butyrophenone, isocaprophenone, 1-phenyl-2-propanone, 1-phenyl-3-butanone, 1-phenyl-4-pentanone, 1,3-diphenyl-2-propanone, dibenzyl ketone, methyl p-tolyl ketone, etc.) in the presence of an acid catalyst (e.g., perchloric acid, p-toluenesulfonic acid, hydrochloric auid, etc.), yields a corresponding alkyl 3-keto (or 3,11-diketo)-14α,15α-dihydroxy-4,17(29)-cis-pregnadien-21-oate, 14α,15α-ketonide (VII).

(7) Reduction of a compound of Formula VII, wherein Z is carbonyl, e.g., with an alkali metal borohydride such as sodium borohydride, yields a corresponding alkyl, 3β,11β,14α,15α-tetrahydroxy-4,17(20) - cis - pregnadien-21-oate,14α,15α-ketonide (VII′).

(8) Oxidation of the 3β-hydroxy group of a compound of Formula VII′ by methods well known in the steroid art, e.g., by treatment with manganese dioxide at room temperature in a solvent such as ethyl acetate, chloroform and the like (in the manner disclosed in J. Org. Chem. 19, 1509 and J. Amer. Chem. Soc. 75, 5930) yields a corresponding alkyl 3-keto-11β,14α,15α-trihydroxy-4,17(20)-cis-pregnadien-21-oate,14α,15α-ketonide (VIII).

(9) The novel compounds of Formulae VII and VIII are converted to their Δ¹-, Δ⁶- and Δ¹,⁶-counterparts in accordance with procedures well known in the art. The Δ¹-derivatives (IX and X) of Formulae VII and VIII, respectively, are produced by 1,2-dehydrogenation with selenium dioxide in the manner disclosed in U.S. Patent 2,971,886 and by dicyanodichlorobenzoquinone (DDQ) as in British Patent 852,847; e.g., by these procedures an alkyl 3,11-diketo-14α,15α-dihydroxy-4,17(20)-cis-pregnadien-21-oate, 14α,15α-ketonide (VII) and the corresponding 11β-hydroxy compound (VIII) are converted to their respective 1,4,17(20)-cis-pregnatrienes (IX and X). The Δ⁴-compounds embraced by Formulae VII and VIII when reacted with tetrachloro-p-benzoquinone (chloranil) in the manner described in J. Amer. Chem. Soc. 79, 1257, yield their corresponding Δ⁴,⁶-derivatives, e.g., alkyl 3,11-diketo-14α,15α-dihydroxy-4,6,17(20)-cis-pregnatrien-21-oate, 14α,15α-ketonide (IX) and alkyl 3-keto-11β,14α,15α-trihydroxy - 4,6,17(20) - cis - pregnatrien-21-oate, 14α,15α-ketonide (X). The Δ⁴,⁶-compounds (IX and X) can be dehydrogenated at the 1(2)-position with selenium dioxide to give the corresponding Δ¹,⁴,⁶-compounds, e.g., alkyl 3-keto-14α,15α-dihydroxy-1,4,6,17(20)-cis-pregnatetraen-21-oate, 14α,15α-ketonide (IX) and alkyl 3-keto-11β,14α,15α-trihydroxy-1,4,6,17(20)-cis-pregnatetraen-21-oate, 14α,15α-ketonide (X). The Δ¹,⁴,⁶-compounds (IX and X) can preferably be prepared by the 6-dehydrogenation of the corresponding Δ¹,⁴-compounds (IX and X) by reaction with chloranil. The Δ¹,⁴,⁶-compounds (IX and X) can also be prepared directly from the Δ⁴-compounds of Formulae VII and VIII, respectively, by reaction with chloranil at elevated temperatures in accordance with the method also set forth in J. Amer. Chem. Soc. 79, 1257.

The 21-oic acid alkyl esters embraced by Formulae V through X can be converted to their corresponding 21-oic acids (V′ through X′) by hydrolysis, e.g., as in Example 1 of U.S. Patent 3,162,631.

All of the compounds included within Formulae II through X of the flow-sheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The compounds embraced by Formulae II through X possess anti-inflammatory, anti-viral, anti-microbial and anti-hormonal activities. They stimulate natural host-defense mechanisms to infectious diseases and virus induced processes. They antagonize the action of prostaglandins and also of Slow Reacting Substance (SRS–A), which is released during anaphylaxis, and are consequently useful in protection against allergy, anaphylaxis, emphysema and hay fever, as well as in the treatment of these ailments in medical and veterinary practice. The anti-SRS–A activity of the aforesaid compounds is assayed by "The Protection of Sensitized Guinea Pigs Against Collapse From Antigen Containing Aerosol Test," a modification of the method described by W. G. Smith, J. Pharm. and Pharmacol. 13, 1(1961).

The compounds of the invention can be prepared and administered to mammals, birds, humans, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

Preparation 1.—15α-hydroxy-11-ketoprogesterone (15α-hydroxy-4-pregnene-3,11,20-trione) (II)

A medium was prepared of 10 g. of Cerelose (dextrose), 20 grams of corn steep liquor and 1000 ml. of water and adjusted to a pH between 5.5 and 6. Twelve liters of this sterilized medium was inoculated with spores of Penicillium urticae ATCC 10120 and incubated for a period of 24 hours at a temperature of 26° C., while stirring and aerating at the rate of 20 to 100 ml. of air per minute per liter of medium. To this medium containing a 24 hour growth of Penicillium urticae was added 2 g. of 11-ketoprogesterone (I), dissolved in 100 ml. of acetone. After an additional 24 hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts, including solvent, were added to the beer filtrate and the combined extracts and beer filtrates were extracted successively with two one-half by volume portions of methylene chloride and then with two one-fourth by volume portions of methylene chloride. The methylene chloride extracts were washed with two one-tenth by volume portions of a 2% aqueous solution of sodium bicarbonate and then with two one-tenth by volume portions of water. After drying the methylene chloride extracts with about 3 to 5 g. of anhydrous sodium sulfate per liter of solvent and filtering, the solvent was distilled from the filtrate. The residue thus obtained was recrystallized two times from acetone and ether in 1 to 1 ratio and one time from acetone and Skellysolve B to give 15α-hydroxy-11-ketoprogesterone (II) of melting point 227 to 229° (in EtOH).

Following the procedure of Preparation 1 but substituting for 11-ketoprogesterone (I) the following:

(1) progesterone (I),
(2) 6α-methylprogesterone (I) and
(3) 6α-methyl-11-ketoprogesterone (I), yields, respectively, (1) 15α-hydroxyprogesterone (II),
(2) 15α-hydroxy-6α-methylprogesterone (II) and
(3) 15α-hydroxy-6α-methyl-11-ketoprogesterone (II).

Example 1.—15α-hydroxy-4-pregnene-3,11,20-trione-15-methyl carbonate (III)

A solution of 18 g. of 15α-hydroxy-4-pregnene-3,11,20-trione (II) in 120 ml. of pyridine was cooled in an ice-salt bath to 0° C. This solution was treated with 18 ml. of methyl chloroformate under anhydrous conditions by dropwise addition of the latter over a period of about 30 minutes, so that the temperature of the reaction mixture did not rise above 3° C. The reaction mixture was kept in a refrigerator at between about 8° to about 10° C. for about 15 hours. The mixture was again cooled to 0° C. with an ice-salt bath and 200 ml. of water added slowly so that the temperature of the mixture did not exceed 10° C. The mixture was stirred in an ice bath for about 2 hours and filtered on a sintered glass Buchner funnel by suction. The crystalline product was washed thoroughly with water and dried in vacuo at 40° C. to constant weight. The yield of 15α-hydroxy-4-pregnene-3,11,20-trione, 15-methyl carbonate (III) was 13.85 g. and the compound had a melting point of 203 to 206° C.

Analysis.—Calcd. for $C_{23}H_{30}O_6$ (percent): C, 68.63; H, 7.51. Found (percent): C, 68.36; H, 7.31.

Following the procedure of Example 1 but substituting other alkyl haloformates for methyl chloroformate, e.g., ethyl fluoroformate, propyl bromoformate, etc., yields the corresponding alkyl carbonate esters, namely, 15α - hydroxy-4-pregnene-3,11,20-trione, 15-ethyl carbonate, 15α-hydroxy - 4-pregnene-3,11,20-trione, 15-propyl carbonate, etc.

Following the procedure of the immediately preceding paragraph and of Example 1 but substituting such starting materials and alkyl haloformates as the following:

(1) 15α - hydroxyprogesterone (II) and butyl chloroformate,
(2) 15α-hydroxy-6α-methyl-11-ketoprogesterone (II) and ethyl bromoformate, etc., yields, respectively, (1) 15α-hydroxyprogesterone, 15-butyl carbonate (III),
(2) 15α - hydroxy - 6α-methyl-11-ketoprogesterone, 15-ethyl carbonate (III), etc.

Example 2.—4,14-pregnadiene-3,11,20-trione (IV)

29 g. of 15α - hydroxy-4-pregnene-3,11,20-trione, 15-methyl carbonate (III) was pyrolyzed in approximately 5 g. increments as follows: the aforesaid compound (III) was charged into a 250 ml. round bottom flask equipped with a magnetic stirring bar and an adapter for evacuating the flask, which then was half immersed in a bath of Woods Metal (50% bismuth, 25% lead, 12.5% tin and 12.5% cadmium) and placed on a magnetic stirring device. The material was pyrolyzed for about 10 minutes at a temperature of between about 240 to about 280° C. The cooled crude products were combined and chromatographed over 750 g. of Florisil (synthetic magnesium silicate). The column was developed with ten 500 ml. portions of 15% acetone in Skellysolver B and six 500 ml. portions of 25% acetone in Skellysolve B. Fractions 6 through 9 gave 17.8 g. of crude product (IV), which on recrystallization from methanol yielded 2 crops weighing 12.1 g. melting at 183 to 184° C. Fractions 10 through 16 gave 7.23 g. of starting material (III). An analytical sample of the product 4,14-pregnadiene-3,11,20-trione (IV), melted at 195 to 198° C.; $[\alpha]_D+219°$ (chloroform); $\lambda$ max. 237 m$\mu$; $\epsilon=16,700$ (ethanol).

Analysis.—Calcd. for $C_{21}H_{26}O_3$ (percent): C, 77.26; H, 8.03. Found (percent): C, 76.92; H, 7.83.

Following the procedure of Example 2 but substituting for 15α - hydroxy - 4-pregnene-3,11,20-trione, 15-methyl carbonate (III) other compounds such as:

(1) 15α - hydroxy-6α-methylprogesterone, 15-propyl carbonate (III),
(2) 15α-hydroxy-6α-methyl-11-ketoprogesterone, 15-ethyl carbonate, etc., yields, respectively, (1) 6α-methyl-4,14-pregnadiene-3,20-dione (IV),
(2) 6α - methyl-4,14-pregnadiene-3,11,20-trione (IV), etc.

Example 3.—Methyl 3,11-diketo-4,14,17(20)-cis-pregnatrien-21-oate (V)

The aforesaid compound (V) and its 21-hydrogen counterpart (Va), as well as their corresponding 6α-methyl and 11-hydrogen derivatives, are prepared from their respective precursors of Formula IV by subjecting the appropriate starting material (IV) to Favorskii rearrangement in accordance with the method described in U.S. Patent 2,790,814, illustratively represented by the following reaction sequence:

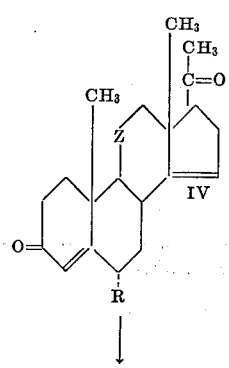

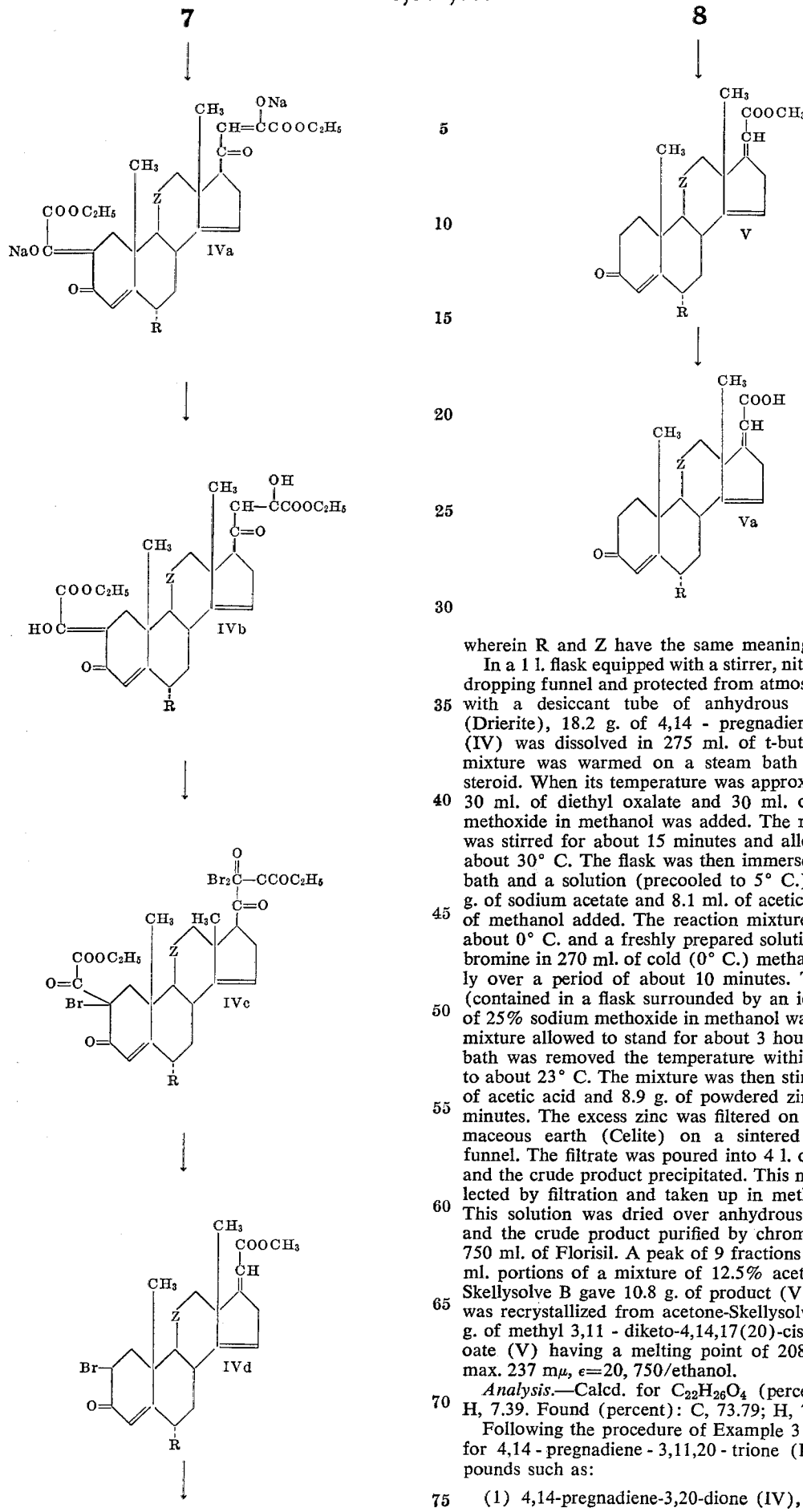

wherein R and Z have the same meaning as above.

In a 1 l. flask equipped with a stirrer, nitrogen inlet tube, dropping funnel and protected from atmospheric moisture with a desiccant tube of anhydrous calcium sulfate (Drierite), 18.2 g. of 4,14 - pregnadiene-3,11,20-trione (IV) was dissolved in 275 ml. of t-butyl alcohol. The mixture was warmed on a steam bath to dissolve the steroid. When its temperature was approximately 55° C., 30 ml. of diethyl oxalate and 30 ml. of 25% sodium methoxide in methanol was added. The reaction mixture was stirred for about 15 minutes and allowed to cool to about 30° C. The flask was then immersed in an ice-salt bath and a solution (precooled to 5° C.) containing 6.8 g. of sodium acetate and 8.1 ml. of acetic acid in 450 ml. of methanol added. The reaction mixture was cooled to about 0° C. and a freshly prepared solution of 28.0 g. of bromine in 270 ml. of cold (0° C.) methanol added slowly over a period of about 10 minutes. To this mixture (contained in a flask surrounded by an ice bath) 67 ml. of 25% sodium methoxide in methanol was added and the mixture allowed to stand for about 3 hours; when the ice bath was removed the temperature within the flask rose to about 23° C. The mixture was then stirred with 45 ml. of acetic acid and 8.9 g. of powdered zinc for about 30 minutes. The excess zinc was filtered on a bed of diatomaceous earth (Celite) on a sintered glass Buchner funnel. The filtrate was poured into 4 l. of ice and water and the crude product precipitated. This material was collected by filtration and taken up in methylene chloride. This solution was dried over anhydrous sodium sulfate and the crude product purified by chromatography over 750 ml. of Florisil. A peak of 9 fractions eluted with 400 ml. portions of a mixture of 12.5% acetone and 87.5% Skellysolve B gave 10.8 g. of product (V). This material was recrystallized from acetone-Skellysolve B to give 8.5 g. of methyl 3,11 - diketo-4,14,17(20)-cis-pregnatrien-21-oate (V) having a melting point of 208 to 214° C., λ max. 237 mμ, ε=20, 750/ethanol.

*Analysis.*—Calcd. for $C_{22}H_{26}O_4$ (percent): C, 74.54; H, 7.39. Found (percent): C, 73.79; H, 7.36.

Following the procedure of Example 3 but substituting for 4,14 - pregnadiene - 3,11,20 - trione (IV) other compounds such as:

(1) 4,14-pregnadiene-3,20-dione (IV), (2) 6α-methyl-4,14-pregnadiene-3,20-dione (IV),
(3) 6α-methyl-4,14-pregnadiene - 3,11,20 - trione (IV), etc., yields, respectively, (1) methyl 3-keto-4,14,17(20)-cis - pregnatrien - 21 - oate (V),
(2) methyl 3-keto-6α-methyl-4,14,17(20)-cis-pregnatrien-21-oate (V),
(3) methyl 3,11-diketo-6α-methyl-4,14,17(20)-cis-pregnatrien-21-oate (V), etc.

Example 4.—3,11-diketo-4,14,17(20)-cis-pregnatrien-21-oic acid (Va)

A solution of 2.5 g. of methyl 3,11-diketo-4,14,17(20)-cis-pregnatrien-21-oate (V) in 75 ml. of methanol is refluxed under a nitrogen atmosphere for about 20 hours with a solution of 2.5 g. of potassium hydroxide in 15 ml. of water. The mixture is then diluted with 200 ml. of water and extracted with methylene chloride to remove any unhydrolyzed ester (V). The aqueous mixture is made acid with ice cold dilute hydrochloric acid. The steroid is extracted with methylene chloride and the extract washed with water until the washings become neutral to test paper. The extract is dried over anhydrous sodium sulfate and concentrated to dryness by distillation in vacuo. The residue is crystallized from ether to give pure 3,11-diketo-4,14,17(20)-cis-pregnatrien-21-oic acid (Va).

Following the procedure of Example 4 but substituting for methyl 3,11-diketo-4,14,17(20) - cis - pregnatrien - 21-oate (V) other compounds such as:

(1) methyl 3-keto-4,14,17(20)-cis-pregnatrien - 21 - oate (V),
(2) methyl 3-keto-6α-methyl-4,14,17(20)-cis-pregnatrien-21-oate (V),
(3) methyl 3,11-diketo-6α-methyl-4,14,17(20)-cis - pregnatrien-21-oate (V), etc., yields, respectively, (1) 3-keto-4,14,17(20)-cis-pregnatrien-21-oic acid (Va),
(2) 3-keto-6α-methyl-4,14,17(20)-cis-pregnatrien-21 - oic acid (Va).
(3) 3,11-diketo-6α-methyl-4,14,17(20)-cis - pregnatrien-21-oic acid (Va), etc.

Example 5.—Methyl 3,11-diketo-14α,15α-dihydroxy-4,17(20)-cis-pregnadien-21-oate (VI)

In 35 ml. of pyridine, 2.3 g. of methyl 3,11-diketo-4,14,17(20)-cis-pregnatrien-21-oate (V) was dissolved. This solution was treated for about 1.5 hours at room temperature with a solution of 1.83 g. of osmium tetroxide in 137 ml. of ether. The reaction mixture was then treated for about 30 minutes with 350 ml. of 0.5% sodium hydrosulfite solution. The ether and most of the pyridine was removed by vacuum distillation from a steam bath. The aqueous residue was extracted several times with methylene chloride. The extract was dried over anhydrous sodium sulfate and concentrated to dryness by vacuum distillation to remove the last traces of pyridine. The nearly black residue weighing about 2.2 g. was redissolved in methylene chloride and chromatographed over a 100 g. column of Florisil. A peak of 7 fractions eluted with 15% acetone in Skellysolve B gave 0.35 g. of starting material (V); a peak of 11 fractions eluted with 25% acetone in Skellysolve B gave 0.445 g. of product (VI) which was recrystallized from the same solvent pair to give 0.43 g. of methyl 3,11-diketo-14α,15α-dihydroxy - 4,17(20) - cis-pregnadien-21-oate (VI) having a melting point of 252 to 253° C., λ max. 236, ε=25,700.

Analysis.—Calcd. for $C_{22}H_{28}O_6$ (percent): C, 68.02; H, 7.26. Found (percent): C, 67.83; H, 7.28.

Following the procedure of Example 5 but substituting for methyl 3,11-diketo-4,14,17(20) - cis - pregnatrien - 21-oate (V) other compounds such as:

(1) methyl 3-keto-4,14,17(20)-cis-pregnatrien - 21 - oate (V),
(2) methyl 3-keto-6α-methyl-4,14,17(20)-cis-pregnatrien-21-oate (V),
(3) methyl 3,11-diketo-6α-methyl-4,14,17(20) - cis - pregnatrien-21-oate (V), etc., yields respectively, (1) methyl 3-keto-14α,15α-dihydroxy-4,17(20)-cis - pregnadien-21-oate (VI),
(2) methyl 3-keto-14α,15α-dihydroxy - 6α - methyl - 4,17(20)-cis-pregnadien-21-oate (VI),
(3) methyl 3,11-diketo-14α,15α-dihydroxy-6α-methyl - 4,17(20)-cis-pregnadien-21-oate (VI), etc.

Example 6.—3,11-diketo-14α,15α-dihydroxy-4,17(20)-cis-pregnadien-21-oic acid (VIa)

Following the procedure of Example 4 but substituting methyl 3,11-diketo-14α,15α-dihydroxy-4,17(20)-cis - pregnadien-21-oate (VI) as starting material, yields 3,11-diketo-14α,15α-dihydroxy-4,17(20)-cis-pregnadien-21 - oic acid (VIa).

Following the procedure of Example 6 but substituting for methyl 3,11-diketo-14α,15α-dihydroxy - 4,17(20) - cis-pregnadien-21-oate (VI) other compounds such as:

(1) methyl 3-keto-14α,15α-dihydroxy-4,17(20)-cis-pregnadien-21-oate (VI),
(2) methyl 3-keto-14α,15α-dihydroxy-6α - methyl - 4,17(20)-cis-pregnadien-21-oate (VI),
(3) methyl 3,11-diketo-14α,15α-dihydroxy-6α-methyl - 4,17(20)-cis-pregnadien-21-oate (VI), etc., yields, respectively, (1) 3-keto-14α,15α-dihydroxy-4,17(20) - cis - pregnadien-21-oic acid (VIa),
(2) 3-keto-14α,15α-dihydroxy-6α-methyl - 4,17(20) - cis-pregnadien-21-oic acid (VIa), etc.

Example 7.—Methyl 3,11-diketo-14α,15α-dihydroxy-4,17(20)-cis-pregnadien-21-oate, 14α,15α-acetonide (VII)

2.05 g. of methyl 3,11-diketo-14α,15α-dihydroxy-4,17(20)-cis-pregnadien-21-oate (VI) was dissolved in 100 ml. of acetone and treated with 10 drops of 70% perchloric acid for about 20 minutes at room temperature. The excess acid was neutralized by pouring the mixture into a mixture of sodium bicarbonate solution and ice water. The reaction mixture was extracted with methylene chloride and the extract dried over anhydrous sodium sulfate and concentrated to dryness by vacuum distillation. The residue was chromatographed over a 150 g. column of Florisil. A peak of 7 fractions eluted with 15% acetone in Skellysolve B gave 2 g. of methyl 3,11-diketo - 14α,15α - dihydroxy-4,17(20)-cis-pregnadien-21-oate, 14α,15α-acetonide (VII) having a melting point of 169 to 172° C., λ max. 233.5, ε=23,850/$C_2H_5OH$.

Analysis.—Calcd. for $C_{25}H_{32}O_6$ (percent): C, 70.07; H, 7.53. Found (percent): C, 69.10; H, 7.34.

Following the procedure of Example 7 but substituting for methyl 3,11-diketo-14α,15α-dihydroxy-4,17(20)-cis-pregnadien-21-oate (VI) other compounds such as:

(1) methyl 3-keto-14α,15α-dihydroxy-4,17(20)-cis-pregnadien-21-oate (VI),
(2) methyl 3-keto-14α,15α-dihydroxy - 6α-methyl-4,17(20)-cis-pregnadien-21-oate (VI),
(3) methyl 3,11-diketo-14α,15α-dihydroxy-6α-methyl-4,17(20)-cis-pregnadien-21-oate (VI), etc., yields, respectively, (1) methyl 3-keto - 14α,15α-dihydroxy-4,17(20)-cis-pregnadien-21-oate, 14α,15α-acetonide (VII),
(2) methyl 3-keto-14α,15α - dihydroxy - 6α-methyl-4,17(20)-cis-pregnadien-21-oate, 14α,15α-acetonide (VII),
(3) methyl 3,11 - diketo-14α,15α-dihydroxy-6α-methyl-4,17(20)-cis-pregnadien-21 - oate, 14α,15α - acetonide (VII), etc.

Following the procedures of the immediately preceding paragraph and of Example 7, but substituting for acetone other ketones such as methyl ethyl ketone, diethyl ketone, methyl propyl ketone, 3,3-dimethyl-2-butanone, dibutyl ketone, diheptyl ketone, ethyl octyl ketone, acetophenone, propiophenone, butyrophenone, benzophenone, 1-phenyl-2-propanone, 1,3-diphenyl-2-propanone, 1-phenyl-3-butanone, dibenzyl ketone, etc., yields the corresponding ketone derivatives (ketonides) of the 14α,15α-dihydroxy-steroids embraced by Formula VII of the flow-sheet, above. For example, treating methyl 3,1-diketo-14α,15α-dihydroxy - 6α - methyl-4,17(20)-cis-pregnadien-21-oate (VI) with acetophenone yields its 14α,15α-acetophenonide (VII).

Example 8.—3,11-diketo-14α,15α-dihydroxy-4,17(20)-cis-pregnadien-21-oic acid, 14α,15α-acetonide (VIIa)

Following the procedure of Example 4 but substituting methyl 3,11-diketo-14α,15α-dihydroxy-4,17(20)-cis-pregnadien-21-oate, 14α,15α-acetonide (VII) as starting material, yields 3,11-diketo-14α,15α-dihydroxy-4,17(20)-cis-pregnadien-21-oic acid, 14α,15α-acetonide (VIIa).

Following the procedure of Example 8 but substituting for methyl 3,11-diketo-14α,15α-dihydroxy-4,17(20)-cis-pregnadien-21-oate, 14α,15α-acetonide (VII) other compounds such as:

(1) methyl 3-keto-14α,15α-dihydroxy-4,17(20)-cis-pregnadien-21-oate, 14α,15α-acetonide (VII),
(2) methyl 3 - keto - 14α,15α-dihydroxy-6α-methyl-4,17(20)-cis-prenadien-21 - oate, 14α,15α-acetonide (VII), etc., yields, respectively, (1) 3-keto-14α,15α-dihydroxy-4,17(20)-cis - pregnadien-21-oic acid, 14α,15α-acetonide (VIIa),
(2) 3-keto - 14α,15α-hydroxy-6α-methyl - 4,17(20) - cis-pregnadien-21-oic acid, 14α,15α-acetonide (VIIa), etc.

Following the procedures of the immediately preceding paragraph and of Example 8, but substituting another ketone for acetone, e.g., dibenzyl ketone, yields the corresponding dibenzyl ketonides (VIIa).

Example 9.—Methyl 3β,11β,14α,15α - tetrahydroxy-4,17(20)-cis-pregnadien-21-oate, 14α,15α-acetonide (VII′)

One part of methyl 3,11-diketo-14α,15α-dihydroxy-4,17(20) - cis - pregnadien - 21 - oate, 14α,15α-acetonide (VII) was dissolved in 20 parts of isopropyl alcohol and refluxed with a solution of 2 parts of sodium borohydride in 4 parts of 0.1 N sodium hydroxide for about 6 hours. The mixture was cooled to about 10° C. and made just acid to test paper with dilute (about 5%) acetic acid. The mixture was partitioned between methylene chloride and water and the organic extract dried over anhydrous sodium sulfate. The dried extract was concentrated to a crystalline mass by vacuum distillation from a water bath kept at about 60° C. to yield methyl 3β,11β,14α,15α-tetrahydroxy-4,17(20) - cis - pregnadien-21-oate, 14α,15α-acetonide (VII′).

Following the procedure of Example 9, but substituting for methyl 3,11-diketo-14α,15α-dihydroxy-4,17(20)-cis-pregnatrien-21-oate, 14α,15α-acetonide (VII) a corresponding compound prepared from one of the ketones set forth in the second paragraph following Example 7, yields another 14α,15α-ketonide of methyl 3β,11β,14α, 15α - tetrahydroxy - 4,17(20) - cis - pregnadien-21-oate (VII′).

Following the procedure of Example 9 but substituting for methyl 3,11-diketo-14α,15α-dihydroxy-4,17(20)-cis-pregnadien-21-oate, 14α,15α-acetonide (VII) its corresponding 6α-methyl compound (VII), yields methyl 3β,11β,14α,15α - tetrahydroxy - 6α - methyl-4,17(20)-cis-pregnadien-21-oate, 14α,15α-acetonide (VII′).

Example 10.—3β,11β,14α,15α-tetrahydroxy-4,17(20)-cis-pregnadien-21-oic acid, 14α,15α-acetonide (VII′a)

Following the procedure of Example 4 but substituting methyl 3β,11β,14α,15α-tetrahydroxy-4,17(20)-cis-pregnadien-21-oate, 14α, 15α-acetonide (VII′) as starting material, yields 3β,11β,14α,15α - tetrahydroxy - 4,17(20)-cis-pregnadien-21-oic acid, 14α,15α-acetonide (VII′a).

Following the procedure of Example 10 but employing methyl 3β,11β,14α,15α-tetrahydroxy-6α-methyl-4,17(20)-cis-pregnadien-21-oate, 14α,15α-acetonide (VII′) as starting material, yields 3β,11β,14α,15α-tetrahydroxy-6α-methyl-4,17(20)-cis-pregnadien-21-oic acid, 14α,15α-acetonide (VII′a).

Following the procedures of the immediately preceding paragraph and Example 10, but substituting for the 14α,15α-acetonides (VII′) employed herein as starting materials a corresponding compound prepared from one of the ketones set forth in the second paragraph following Example 7, yields another 14α,15α-ketonide (VII′a).

Example 11.—Methyl 3-keto-11β,14α,15α-trihydroxy-4,17(20)-cis pregnadien - 21 - oate, 14α,15α-acetonide (VIII)

One part of methyl 3β,11β,14α,15α-tetrahydroxy-4,17 (20) - cis - pregnadien-21-oate,14α,15α-acetonide (VII′) was dissolved in 100 parts of ethyl acetate and shaken with 3.5 parts of activated manganese dioxide at room temperature for about 24 hours. The mixture was filtered with the aid of 1 part of Celite and the filtrate concentrated to give crystalline methyl 3-keto-11β,14α,15α-trihydroxy - 4,17(20)-cis-pregnadien-21-oate, 14α,15α-acetonide (VIII).

Following the procedure of Example 11, but substituting for methyl 3β,11β,14α,15α-tetrahydroxy-4,17 (20)-cis-pregnadien-21-oate,14α,15α-acetonide (VII′) a corresponding compound prepared from one of the ketones set forth in the second paragraph following Example 7, yields another 14α,15α-ketonide of methyl 3-keto - 11β,14α,15α - trihydroxy-4,17(20)-cis-pregnadien-21-oate (VIII).

Following the procedure of Example 11 but substituting for methyl 3β,11β,14α,15α-tetrahydroxy-4,17 (20)-cis-pregnadien-21-oate, 14α,15α-acetonide (VII′) its 6α-methyl counterpart (VII′) yields methyl 3-keto-11β, 14α,15α - trihydroxy-6α-methyl-4,17(20)-cis-pregnadien-21-oate, 14α,15α-acetonide (VIII).

Example 12.—3 - keto-11β,14α,15α-trihydroxy-4,17(20)-cis-pregnadien-21-oic acid, 14α,15α-acetonide (VIIIa)

Following the procedure of Example 4 substituting methyl 3-keto - 11β,14α,15α - trihydroxy-4,17(20)-cis-pregnadien-21-oate, 14α,15α-acetonide (VIII) as starting material, yields 3-keto-11β,14α,15α-trihydroxy-4,17 (20) - cis - pregnadien-21-oic acid, 14α,15α-acetonide (VIIIa).

Following the procedure of Example 12 but employing material, yields 3-keto-11β,14α,15α-trihydroxy-4,17 (20)-cis-pregnadien-21-oate, 14α,15α-acetonide (VIII) as starting material, yields 3-keto-11β,14α,15α-trihydroxy-6α-methyl-4,17(20)-cis-pregnadien-21-oic acid, 14α,15α-acetonide (VIIIa).

Following the procedures of the immediately preceding paragraph and Example 12, but substituting a corresponding compound prepared from one of the ketones set forth in the second paragraph following Example 7 for the 14α,15α-acetonides (VIII) employed herein, yields another 14α,15α-ketonide (VIIIa).

Example 13.—Methyl 3,11 - diketo-14α,15α-dihydroxy-1,4,17(20) - cis - pregnatrien-21-oate,14α,15α-acetonide (IX)

A mixture containing 10 g. of methyl 3,11-diketo-14α, 15α-dihydroxy-4,17(20)-cis-pregnadien-21-oate, 14α,15α-acetonide (VII), 500 ml. of tertiary butyl alcohol, 5 ml.

of glacial acetic acid and 4 g. of selenium dioxide is warmed at reflux for a period of about 24 hours. An additional 4 g. portion of selenium dioxide is added and warming is continued for another 24-hour period. The reaction mixture is cooled and filtered. The filtrate is concentrated to about 150 ml., then slowly diluted with 850 ml. of water. The resulting precipitate is isolated by filtration. The precipitate is dissolved in 300 ml. of ethyl acetate, then washed successively with four 100 ml. portions of freshly prepared cold ammonium sulfide, dilute ammonium hydroxide, water, dilute hydrochloric acid and water. The solution is dried over sodium sulfate and evaporated to give a residue containing methyl 3,11-diketo - 14α,15α - dihydroxy-1,4,17(20)-cis-pregnatrien-21-oate, 14α,15α-acetonide (IX). The residue is dissolved in 50 ml. of methylene chloride and 100 ml. of Skellysolve B. The solution is then chromatographed over a column containing 400 g. of Florisil. The column is eluted with Skellysolve B. The solution is then chromatographed over a column containing 400 g. of Florisil. The column is eluted with Skellysolve B containing increasing proportions of acetone to give methyl 3,11-diketo - 14α,15α - dihydroxy-1,4,17(20)-cis-pregnatrien-21-oate, 14α,15α-acetonide (IX), a light colored, crystalline solid, which can be further purified by recrystallization from acetone-Skellysolve B mixtures.

Heating methyl 3,11 - diketo - 14α,15α-dihydroxy-4,17(20)-cis-pregnadien-21-oate, 14α,15α-acetonide (VII) in dry benzene with 2,3-dichloro-5,6-dicyanobenzoquinone under reflux for a period of about 12 hours (as in British Patent 852,847) also yields methyl 3,11-diketo-14α,15α-dihydroxy - 1,4,17(20)-cis-pregnatrien-21-oate, 14α,15α-acetonide (IX).

Following the procedures of Example 13 and the paragraph thereafter but employing methyl 3,11-diketo-14α, 15α - dihydroxy - 6α-methyl-4,17(20)-cis-pregnadien-21-oate, 14α,15α-acetonide (VII) as starting material, yields methyl 3,11 - diketo-14α,15α-dihydroxy-6α-methyl-1,4,17 (20)-cis-pregnatrien-21-oate, 14α,15α acetonide (IX).

Following the procedures of the immediately preceding paragraph and Example 13, but substituting a corresponding compound prepared from one of the ketones set forth in the second paragraph following Example 7 for the 14α,15α-acetonides employed herein, yields another $\Delta^{1,4,17,(20)}$-14α,15α-ketonide (IX).

The corresponding (1) 11-hydrogen and (2) 6α-methyl-11-hydrogen compounds of Formula VII prepared in the first paragraph following Example 7 can likewise be converted to their $\Delta^1$-counterparts (IX) by following the procedures of the three immediately above paragraphs and of Example 13.

Example 14.—Methyl 3,11-diketo-14α,15α-dihydroxy-4,6, 17(20)-cis-pregnatrien-21-oate, 14α,15α-acetonide (IX)

A solution of 12 g. of methyl 3,11-diketo-14α,15α-dihydroxy-4,17(20)-cis-pregnadien-21-oate, 14α,15α-acetonide (VII) and 10 g. of chloranil (tetrachloro-p-benzoquinone) in 500 ml. of tertiary amyl alcohol is refluxed for a period of about 4.5 hours. The tertiary amyl alcohol is then distilled under vacuum in a nitrogen atmosphere. The residue is dissolved in methylene chloride and then shaken with dilute sodium hydroxide. The precipitate that forms is separated by filtration through diatomaceous earth. The organic phase of the filtrate is separated and washed with dilute sodium hydroxide, water and then dried. The solvent is distilled leaving a residue (crude and crystalline) with after purification by chromatography through a Florisil column and crystallization gives methyl 3,11-diketo-14α,15α-dihydroxy-4,6,17(20)-cis-pregnatrien-21-oate, 14α,15α-acetonide (IX).

Following the procedure of Example 14 but employing methyl 3,11-diketo-14α,15α-dihydroxy-6α-methyl-4,17 (20) - cis - pregnadien - 21-oate, 14α,15α-acetonide (VII), yields methyl 3,11-diketo-14α,15α-dihydroxy-6α-methyl-4,6,17(20) - cis - pregnatrien - 21 - oate, 14α,15α-acetonide (IX).

Following the procedures of the immediately preceding paragraph and Example 14, but substituting a corresponding compound prepared from one of the ketones set forth in the second paragraph following Example 7 for the 14α,15α-acetonides employed herein, yields another $\Delta^{4,6,17(20)}$-14α,15α-ketonide (IX).

The corresponding (1) 11-hydrogen and (2) 6α-methyl-11-hydrogen compounds of Formula VII prepared in the first paragraph following Example 7 can likewise be converted to their $\Delta^6$-counterparts (IX) by following the procedures of the two immediately above paragraphs and of Example 14.

Example 15.—Methyl 3,11-diketo-14α,15α-dihydroxy-1,4, 6,17(20)-cis-pregnatetraen-21-oate, 14α,15α-acetonide (IX).

A mixture containing 10 g. of methyl 3,11-diketo-14α, 15α-dihydroxy-4,6,17(20)-cis-pregnatrien-21-oate, 14α,-15α-acetonide (IX), 500 ml. of tertiary butyl alcohol, 5 ml. of glacial acetic acid and 4 g. of selenium dioxide is warmed at reflux for 24 hours. An additional 4 g. portion of selenium dioxide is added and warming is continued for another 24-hour period. The reaction mixture is cooled and filtered. The filtrate is concentrated to about 150 ml., then slowly diluted with 850 ml. of water. The resulting precipitate is isolated by filtration. The precipitate is dissolved in 300 ml. of ethyl acetate, then washed with four 100 ml. portions of freshly prepared cold ammonium sulfide, dilute ammonium hydroxide, water, dilute hydrochloric acid and water. The solution is dried over sodium sulfate and evaporated to give a residue containing methyl 3,11-diketo-14α,15α-dihydroxy-1,4,6,17(20)-cis-pregnatetraen-21-oate, 14α,15α-acetonide (IX). The residue is dissolved in 50 ml. of methylene chloride and 100 ml. of Skellysolve B hexanes. The solution is then chromatographed over a column containing 400 g. of Florisil. The column is eluted with increasing proportions of acetone in Skellysolve B to give methyl 3,11 - diketo - 14α,15α - dihydroxy - 1,4,6,17(20) - cis-pregnatetraen-21-oate, 14α,15α-acetonide (IX), a crystalline solid, which can be further purified by recrystallization from acetone-Skellysolve B mixtures.

Following the procedure of Example 15 but employing methyl 3,11-diketo-14α,15α-dihydroxy-6α-methyl-4,6, 17(20)-cis-pregnatrien-21-oate, 14α,15α-acetonide (IX) as starting material, yields methyl 3,11-diketo-14α,15α-dihydroxy - 6α - methyl - 1,4,6,17(20) - cis - pregnatetraen-21-oate, 14α,15α-acetonide (IX).

Following the procedures of the immediately preceding paragraph and Examples 15, but substituting a corresponding compound prepared from one of the ketones set forth in the second paragraph following Example 7 for the 14α,15α-acetonides employed herein, yields another $\Delta^{1,4,6,17(20)}$-14α,15α-ketonide (IX).

The corresponding (1) 11-hydrogen and (2) 6α-methyl-11-hydrogen compounds of Formula VII prepared in the first paragraph following Example 7 can likewise be converted to their $\Delta^{1,4,6}$-counterparts (IX) by following the procedures of Example 14, the two immediately above paragraphs and of Example 15.

Example 16.—Methyl 3,11-diketo-14α,15α-dihydroxy-1,4, 6,17(20) - cis - pregnatetraen - 21 - oate, 14α,15α-acetonide (IX)

A solution of 12 g. of methyl 3,11-diketo-14α,15α-dihydroxy - 1,4,17(20) - cis - pregnatrien - 21 - oate, 14α,15α-acetonide (IX) and 10 g. of chloranil in 500 ml. of tertiary amyl alcohol is refluxed for a period of about 4.5 hours. The tertiary amyl alcohol is then distilled off under vacuum in a nitrogen atmosphere. The residue is dissolved in methylene chloride and then shaken with dilute sodium hydroxide. The precipitate that forms is separated by filtration through diatomaceous earth. The organic phase of the filtrate is separated, washed first with dilute sodium hydroxide solution, then water and dried. The solvent is distilled off leaving a residue of crystalline methyl 3,11-diketo-14α,15α-dihydroxy-1,4,6,17(20)-cis-pregnatetraen-21-oate, 14α,15α-acetonide (IX).

Following the procedure of Example 16 but employing methyl 3,11-diketo-14α,15α-dihydroxy-6α-methyl-1,4,17(20)-cis-pregnatrien-21-oate, 14α,15α-acetonide (IX.) as starting material, yields methyl 3,11-diketo-14α,15α-dihydroxy - 6α - methyl - 1,4,6,17(20) - cis - pregnatetraen-21-oate, 14α,15α-acetonide (IX).

Following the procedures of the immediately preceding paragraph and Example 16, but substituting a corresponding compound prepared from one of the ketones set forth in the second paragraph following Example 7 for the 14α,15α-acetonides employed herein, yields another $\Delta^{1,4,6,17(20)}$-14α,15α-ketonide.

The corresponding (1) 11-hydrogen and (2) 6α-methyl-11-hydrogen compounds of Formula VII prepared in the first paragraph following Example 7 can likewise be converted to their $\Delta^{1,4,6}$-counterparts (IX) by following the procedures of Example 14, the two immediately above paragraphs and of Example 16.

Example 17.—Methyl 3-keto-11β,14α,15α-trihydroxy-1,4,17(20) - cis-pregnatrien-21-oate, 14α,15α - acetonide (X)

Following the procedures of Example 13 and the first paragraph thereafter, but substituting methyl 3-keto-11β,14α,15α-trihydroxy-4,17(20)-cis-pregnadien-21-oate, 14α,15α-acetonide (VIII) as starting material yields methyl 3-keto-11β,14α,15α-trihydroxy - 1,4,17(20) - cis - pregnatrien-21-oate, 14α,15α-acetonide (X).

Following the procedures of the second and third paragraphs following Example 13 but employing the corresponding 11β-hydroxy compounds (VIII) as starting materials instead of the 11-ketones (VII), yields the 11β-hydroxy-14α,15α-ketonide, counterparts (X).

Example 18.—Methyl 3-keto-11β,14α,15α-trihydroxy-4,6,17(20) - cis-pregnatrien-21-oate, 14α,15α - acetonide (X)

Following the procedure of Example 14, but substituting methyl 3-keto-11β,14α,15α-trihydroxy-4,17(20)-cis-4,17(20)-cis-pregnadien-21-oate, 14α,15α-acetonide (VIII) as starting material, yields methyl 3-keto-11β,14α,15α-trihydroxy-4,6,17(20)-cis-pregnatrien - 21 - oate, 14α,15α-acetonide (X).

Following the procedures of the first and second paragraphs following Example 14 but employing the corresponding 11β-hydroxy compound (VIII) as starting materials instead of the 11-ketones (VII), yields the 11β-hydroxy-14α,15α-ketonide counterparts (X).

Example 19.—Methyl 3-keto-11β,14α,15α-trihydroxy-1,4,6,17(20) - cis-pregnatetraen-21 - oate, 14α,15α- acetonide (X)

Following the procedure of Example 15 but substituting methyl 3-keto-11β,14α,15α-trihydroxy-4,6,17(20)-cis-pregnatrien-21-oate, 14α,15α-acetonide (VIII) as starting material, yields methyl 3-keto-11β,14α,15α-trihydroxy-1,4,6,17(20)-cis-pregnatetraen-21-oate, 14α,15α-acetonide (X).

Following the procedures of the first and second paragraphs following Example 15 but employing the corresponding 11β-hydroxy compounds (VIII) as starting materials instead of the 11-ketones (VII), yields the 11β-hydroxy-14α,15α-ketonide counterparts (X).

Example 20.—Methyl 3-keto-11β,14α,15α-trihydroxy-1,4,6,17(20) - cis-pregnatetraen-21-oate, 14α,15,α-acetonide (X)

Following the procedure of Example 16 but substituting methyl 3-keto-11β,14α,15α-trihydroxy-1,4,17(20)-cis-pregnatrien-21-oate, 14α,15α-acetonide (VIII) as starting material, yields methyl 3-keto-11β,14α,15α-trihydroxy-1,4,6,17(20)-cis-pregnatetraen-21-oate, 14α,15α-acetonide (X).

Following the procedures of the first and second paragraphs following Example 16 but employing the corresponding 11β-hydroxy compounds (VIII) as starting materials instead of the 11-ketones (VII), yields the 11β-hydroxy-14α,15α-ketonide counterparts (X).

Example 21.—Production of 21-oic acids (IXa, Xa) by hydrolysis of corresponding 21-oic acid methyl esters (IX, X)

Following the procedure of Example 4, but substituting for the starting 21-oic acid methyl ester employed therein other compounds such as:

(1) methyl 3,11-diketo-14α,15α-dihydroxy-1,4,17(20)-cis-pregnatrien-21-oate, 14α,15α-acetonide (IX),
(2) methyl 3,11-diketo-14α,15α-dihydroxy-6α-methyl-1,4,17(20)-cis-pregnatrien-21-oate, 14α,15α-acetonide (IX),
(3) methyl 3-keto-14α,15α-dihydroxy-1,4,17(20)-cis-pregnatrien-21-oate, 14α,15α-acetonide (IX),
(4) methyl 3-keto-14α,15α-dihydroxy-6α-methyl-1,4,17(20)-cis-pregnatrien-21-oate, 14α,15α-acetonide (IX),
(5) methyl 3-keto-11β,14α,15α-trihydroxy-1,4,17(20)-cis-pregnatrien-21-oate, 14α,15α-acetonide (X),
(6) methyl 3-keto-11β,14α,15α-trihydroxy-6α-methyl-4,6,17(20)-cis-pregnatrien-21-oate, 14α,15α-acetonide (X),
(7) methyl 3,11-diketo-14α,15α-dihydroxy-4,6,17(20)-cis-pregnatrien-21-oate, 14α,15α-acetonide (IX),
(8) methyl 3,11 - diketo-14α,15α-dihydroxy-6α-methyl-4,6,17(20)-cis-pregnatrien-21-oate, 14α,15α-acetonide (IX),
(9) methyl 3-keto-14α,15α-dihydroxy-4,6,17(20)-cis-pregnatrien-21-oate, 14α,15α-acetonide (IX),
(10) methyl 3 - keto-14α,15α-dihydroxy-6α-methyl-1,4,6,17(20)-cis-pregnatrien-14α,15α-acetonide (IX),
(11) methyl 3-keto-11β,14α,15α-trihydroxy-4,6,17(20)-cis-pregnatrien-21-oate, 14α,15α-acetonide (X),
(12) methyl 3-keto-11β,14α,15α-trihydroxy-6α-methyl-cis-pregnatrien-21-oate, 14α,15α-acetonide (X),
(13) methyl 3,11-diketo-14α,15α-dihydroxy-1,4,6,17(20)-cis-pregnatetraen-21-oate, 14α,15α-acetonide (IX),
(14) methyl 3,11-diketo-14α,15α-dihydroxy-6α-methyl-1,4,6,17(20)-cis-pregnatetraen-21-oate, 14α,15α-acetonide (IX),
(15) methyl 3-keto-14α,15α-dihydroxy-1,4,6,17(20)-cis-pregnatetraen-21-oate, 14α,15α-acetonide (IX),
(16) methyl 3-keto-14α,15α-dihydroxy-6α-methyl-1,4,6,17(20)-cis-pregnatetraen-21-oate, 14α,15α-acetonide (IX),
(17) methyl 3-keto-11β,14α,15α-trihydroxy-1,4,6,17(20)-cis-pregnatetraen-21-oate, 14α,15α-acetonide (X),
(18) methyl 3-keto-11β,14α,15α-trihydroxy-6α-methyl-1,4,6,17(20)-cis-pregnatetraen-21-oate, 14α,15α-acetonide (X), etc., yields, respectively, (1) 3,11-diketo-14α,15α-dihydroxy-1,4,17(20)-cis-pregnatrien-21-oic acid, 14α,15α-acetonide (IXa),
(2) 3,11-diketo-14α,15α-dihydroxy-6α-methyl-1,4,17(20)-cis-pregnatrien-21-oic acid, 14α,15α-acetonide (IXa),
(3) 3-keto-14α,15α-dihydroxy-1,4,17(20)-cis-pregnatrien-21-oic acid, 14α,15α-acetonide (IXa),
(4) 3-keto-14α,15α-dihydroxy-6α-methyl-1,4,17(20)-cis-pregnatrien-21-oic acid, 14α,15α-acetonide (IXa),
(5) 3-keto-11β,14α,15α-trihydroxy-1,4,17(20)-cis-pregnatrien-21-oic acid, 14α,15α-acetonide (Xa),
(6) 3-keto-11β-,14α,15α-trihydroxy-6α-methyl-,4,6,17-(20)-cis-pregnatrien-21-oic acid, 14α,15α-acetonide (Xa),
(7) 3,11-diketo-14α,15α-dihydroxy-4,6,17(20)-cis-pregnatrien-21-oic acid, 14α,15α-acetonide (IXa),
(8) 3,11-diketo-14α,15α-dihydroxy-6α-methyl-4,6,17-(20)-cis-pregnatrien-21-oic acid, 14α,15α-acetonide (IXa),
(9) 3-keto-14α,15α-dihydroxy-4,6,17(20)-cis-pregnatrien-21-oic acid, 14α,15α-acetonide (IXa),

(10) 3-keto-14α,15α-dihydroxy-6α-methyl-4,6,17(20)-cis-pregnatrien-21-oic acid, 14α,15α-acetonide (IXa),
(11) 3-keto-11β,14α,15α-trihydroxy-4,6,17(20)-cis-pregnatrien-21-oic acid, 14α,15α-acetonide (Xa),
(12) 3-keto-11β,14α,15α-trihydroxy-6α-methyl-cis-pregnatrien-21-oic acid, 14α,15α-acetonide (Xa),
(13) 3,11-diketo-14α,15α-dihydroxy-1,4,6,17(20)-cis-pregnatetraen-21-oic acid, 14α,15α-acetonide (IXa),
(14) 3,11-diketo-14α,15α-dihydroxy-6α-methyl-1,4,6,17(20)-cis-pregnatetraen-21-oic acid, 14α,15α-acetonide (IXa),
(15) 3-keto-14α,15α-dihydroxy-1,4,6,17(20)-cis-pregnatetraen-21-oic acid, 14α-15α-acetonide (IXa),
(16) 3-keto-14α-15α-dihydroxy-6α-methyl-1,4,6,17(20)-cis-pregnatetraen-21-oic acid, 14α,15α-acetonide (IXa),
(17) 3-keto-11β-,14α,15α-trihydroxy-1,4,6,17(20)-cis-pregnatetraen-21-oic acid, 14α,15α-acetonide (Xa),
(18) 3-keto-11β,14α,15α-trihydroxy-6α-methyl-1,4,6,17(20)-cis-pregnatetraen-21-oic acid, 14α,15α-acetonide (Xa), etc.

Following the procedure of Example 21 but substituting a corresponding compound prepared from one of the ketones set forth in the second paragraph following Example 7 for the 14α,15α-acetonides (IX, X) employed herein, yields another 14α,15α-ketonide (IXa, Xa).

We claim:

1. Compounds of the formula

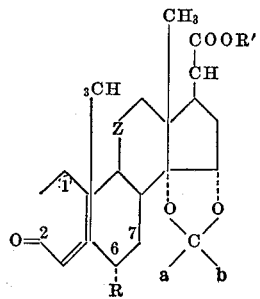

wherein the 1(2)- and 6(7)-carbon atom linkages are selected from the group consisting of single bonds and double bonds; R and R' are selected from the group consisting of hydrogen and methyl; Z is selected from the group consisting of the methylene radical (>CH₂), the β-hydroxymethylene radical

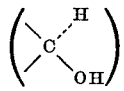

and the carbonyl radical (>C=O); a and b are selected from the group consisting of lower alkyl of from one through twelve carbon atoms, phenyl and benzyl.

2. A compound of claim 1 wherein the 1(2)- and 6(7)-carbon atom linkages are single bonds, R is hydrogen, R' is methyl, Z is β-hydroxymethylene and a and b are methyl, namely, methyl 3-keto-11β,14α,15α-trihydroxy-4,17(20)-cis-pregnadien-21-oate, 14α,15α-acetonide.

3. A compound of claim 1 wherein the 1(2)- and 6(7)-carbon atom linkages are single bonds, R is hydrogen, R' is methyl, Z is carbonyl and a and b are methyl, namely, methyl 3,11-diketo-14α,15α-dihydroxy-4,17(20)-cis-pregnadien-21-oate 14α,15α-acetonide.

4. A compound of claim 1 wherein the 1(2)- and 6(7)-carbon atom linkages are single bonds, R and R' are methyl, Z is β-hydroxymethylene and a and b are methyl, namely, methyl 3-keto-11β,14α,15α-trihydroxy-6α-methyl-4,17(20)-cis-pregnadiene - 21 - oate, 14α,15α-acetonide.

5. A compound of claim 1 wherein the 1(2)-carbon atom linkage is a double bond, the 6(7)-carbon atom linkage is a single bond, R is hydrogen, R' is methyl, Z is β-hydroxymethylene and a and b are methyl, namely, methyl 3 - keto - 11β,14α,15α-trihydroxy-1,4,17(20)-cis-pregnatrien-21-oate, 14α,15α-acetonide.

6. A compound of claim 1 wherein the 1(2)-carbon atom linkage is a single bond, the 6(7)-carbon atom linkage is a double bond, R is hydrogen, R' is methyl, Z is β-hydroxymethylene and a and b are methyl, namely, methyl 3 - keto - 11β,14α,15α-trihydroxy-4,6,17(20)-cis-pregnatrien-21-oate, 14α,15α-acetonide.

7. A compound of claim 1 wherein the 1(2)- and 6(7)-carbon atom linkages are double bonds, R is hydrogen, R' is methyl, Z is β-hydroxymethylene and a and b are methyl, namely, methyl 3-keto-11β,14α,15α-trihydroxy - 1,4,6,17(20)-cis-pregnatetraen-21-oate, 14α,15α-acetonide.

8. A compound of claim 1 wherein the 1(2)- and 6(7)-carbon atom linkages are single bonds, R and R' are hydrogen, Z is β-hydroxymethylene and a and b are methyl, namely, 3-keto-11β,14α,15α-trihydroxy-4,17(20)-cis-pregnadien-21-oic acid, 14α,15α-acetonide.

9. Compounds of the formula

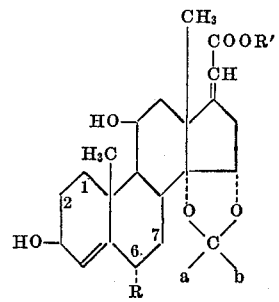

wherein the 1(2)- and 6(7)-carbon atom linkages are selected from the group consisting of single bonds and double bonds; R and R' are selected from the group consisting of hydrogen and methyl; a and b are selected from the group consisting of lower alkyl of from one through twelve carbon atoms, phenyl and benzyl.

10. A compound of claim 9 wherein the 1(2)- and 6(7)-carbon atom linkages are single bonds, R is hydrogen and R', a and b are methyl, namely, methyl, 3β,11β,14α,15α-tetrahydroxy-4,17(20) - cis - pregnadien-21-oate, 14α,15α-acetonide.

11. Compounds of the formula

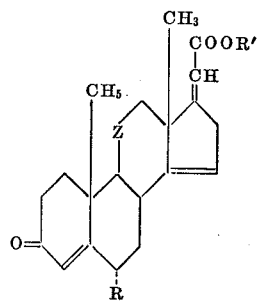

wherein R and R' are selected from the group consisting of hydrogen and methyl and Z is selected from the group consisting of methylene and carbonyl.

12. A compound of claim 11 wherein R is hydrogen,

R' is methyl and Z is carbonyl, namely, methyl 3,11-diketo-4,14,17(20)-cis-pregnatrien-21-oate.

13. Compounds of the formula

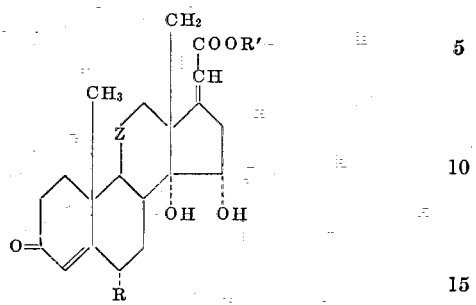

wherein R and R' are selected from the group consisting of hydrogen and methyl and Z is selected from the group consisting of methylene and carbonyl.

14. A compound of claim 13 wherein R is hydrogen, R' is methyl and Z is carbonyl, namely, methyl 3,11-diketo-14α,15α-dihydroxy-4,17(20)-cis-pregnadien-21-oate.

15. A process for the production of a compound of claim 1 of the formula

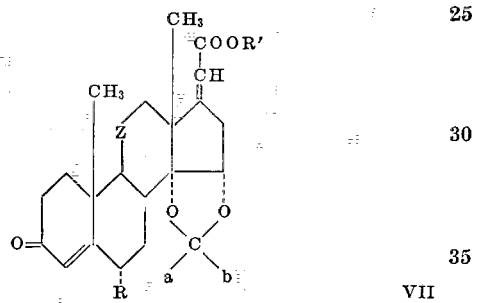

wherein R is selected from the group consisting of hydrogen and methyl, R' is lower alkyl, Z is selected from the group consisting of methylene and carbonyl and $a$ and $b$ are selected from the group consisting of lower alkyl of from one through twelve carbon atoms, phenyl and benzyl, which comprises:

(1) fermenting a corresponding compound of the formula

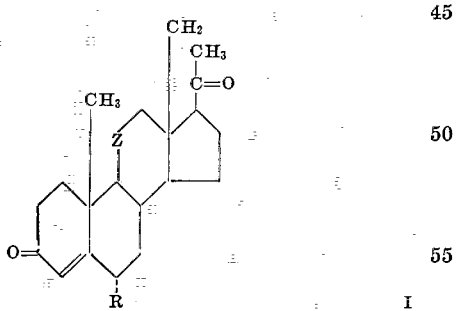

wherein R and Z have the same meaning as above, with a 15α-hydroxylating microorganism to yield a corresponding compound of the formula

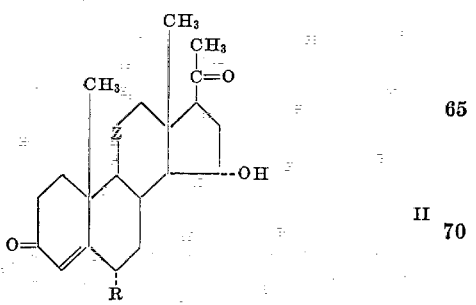

wherein R and Z have the same meaning as above;
(2) mixing a thus produced corresponding compound of Formula II with an alkyl haloformate to yield a corresponding compound of the formula

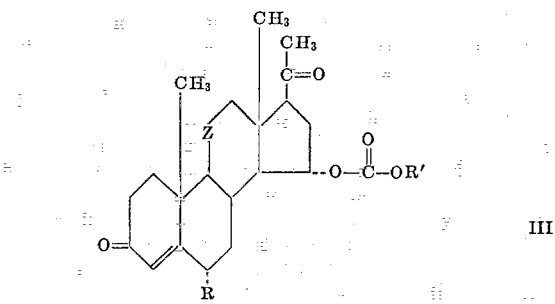

wherein R, R' and Z have the same meaning as above;
(3) pyrolyzing a thus produced corresponding compound of Formula III to yield a corresponding compound of the formula

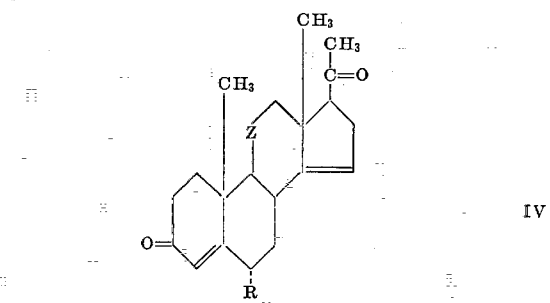

wherein R and Z have the same meaning as above;
(4) subjecting to Favorskii rearrangement a thus produced corresponding compound of Formula IV to yield a corresponding compound of the formula

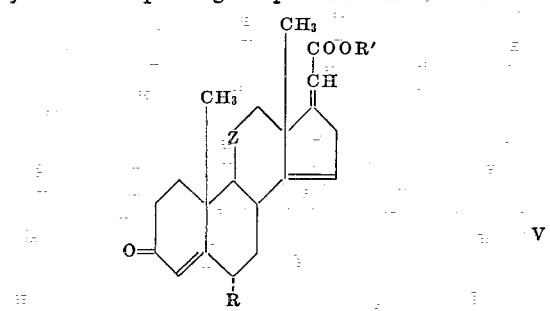

wherein R, R' and Z have the same meaning as above;
(5) oxidizing a thus produced corresponding compound of Formula V at the 14α- and 15α- positions to yield a corresponding compound of the formula

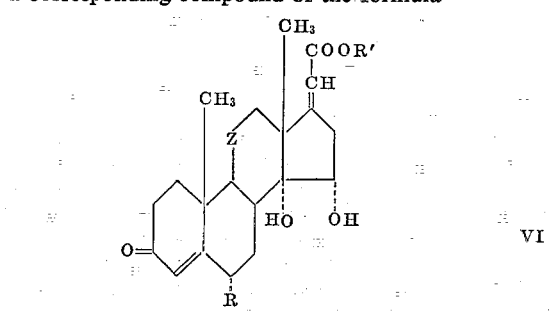

wherein R, R' and Z have the same meaning as above;
(6) treating a thus produced corresponding compound of Formula VI with a ketone of the formula

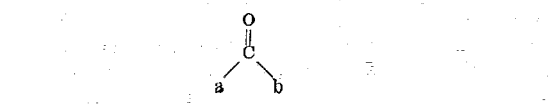

wherein a and b have the same meaning as above, in the presence of an acid catalyst, to yield a corresponding compound of Formula VII, above.

16. A process in accordance with claim 15 wherein the compound of Formula I is 4-pregnene-3,11,20-trione, the compound of Formula II is 15α-hydroxy-4-pregnene-3,11,20-trione, the compound of Formula III is 15α-hydroxy-4-pregnene-3,11,20-trione, 15 - carbonate ester, the compound of Formula IV is 4,14-pregnadiene-3,11,20-trione, the compound of Formula V is methyl 3,11-diketo-4,14,17(20)-cis-pregnatrien-21 - oate, the compound of Formula VI is methyl 3,11-diketo-14α,15α-dihydroxy - 4,17(20)-cis-pregnadien-21-oate and the compound of Formula VII is methyl 3,11-diketo-14α,15α-dihydroxy-4,17(20)-cis-pregnadien-21-oate, 14α,15α-acetonide.

17. A process for the production of a compound of claim 1 of the formula

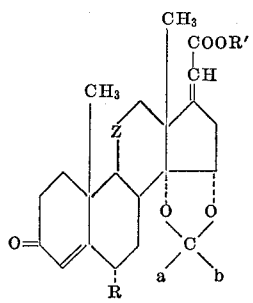

VII wherein R is selected from the group consisting of hydrogen and methyl, R' is lower alkyl, Z is selected from the group consisting of methylene and carbonyl and a and b are selected from the group consisting of alkyl of from one through twelve carbon atoms, phenyl and benzyl, which comprises:

(1) subjecting to Favorskii rearrangement of a correponding compound of the formula

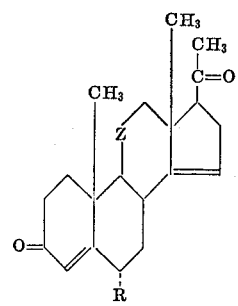

IV wherein R and Z have the same meaning as above, to yield a corresponding compound of the formula

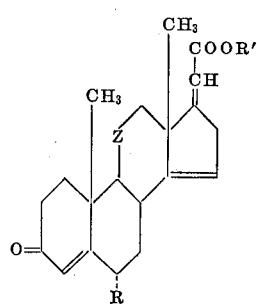

V wherein R, R' and Z have the same meaning as above;
(2) oxidizing a thus produced corresponding compound of Formula V at the 14α- and 15α- positions to yield a corresponding compound of the formula

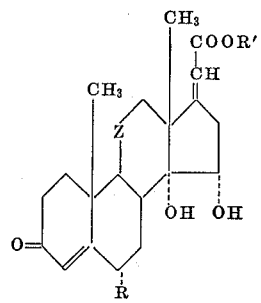

VI wherein R, R' and Z have the same meaning as above;
(3) treating a thus produced corresponding compound of Formula VI with a ketone of the formula

wherein a and b have the same meaning as above, in the presence of an acid catalyst, to yield a corresponding compound of Formula VII, above.

18. A process in accordance with claim 17 wherein the compound of Formula IV is 4,14-pregnadiene-3,11,20-dione, the compound of Formula V is methyl 3,11-diketo-4,14,17(20)-cis-pregnatrien-21-oate, the compound of Formula VI is methyl 3,11-diketo-14α,15α-dihydroxy-4,17(20)-cis-pregnadien-21-oate and the compound of Formula VII is methyl 3,11-diketo - 14α,15α-dihydroxy-4,17(20)-cis-pregnadien-21-oate, 14α,15α-acetonide.

19. A process for the production of a compound of claim 1 of the formula

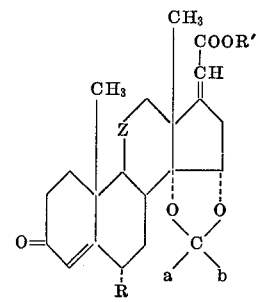

VII wherein R is selected from the group consisting of hydrogen and methyl, R' is lower alkyl, Z is selected from the group consisting of methylene and carbonyl and a and b are selected from the group consisting of lower alkyl of from one through twelve carbon atoms, phenyl and benzyl, which comprises:

(1) oxidizing a corresponding compound of the formula

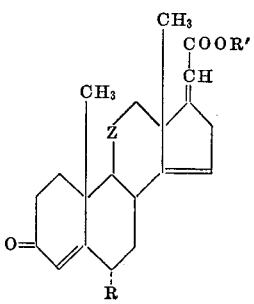

V wherein R, R' and Z have the same meaning as above, to yield a corresponding compound of the formula

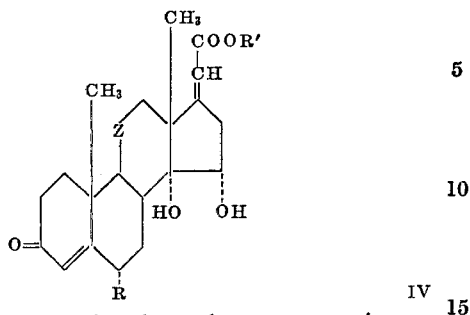

IV wherein R, R' and Z have the same meaning as above;

(2) treating a thus produced corresponding compound of Formula VI with a ketone of the formula

wherein $a$ and $b$ have the same meaning as above, in the presence of an acid catalyst to yield a corresponding compound of Formula VII, above.

20. A process in accordance with claim 19 wherein the compound of Formula V is methyl 3,11 - diketo-4,14,17(20)-cis-pregnatrien-21-oate, the compound of Formula VI is methyl 3,11 - diketo-14α,15α-dihydroxy-4,14,17(20)-cis-pregnatrien - 21 - oate, the compound of Formula VI is methyl 3,11 - diketo-14α,15α-dihydroxy-4,17(20)-cis-pregnadien-21-oate, 14α,15α-acetonide.

21. A process for the production of a compound of claim 1 of the formula

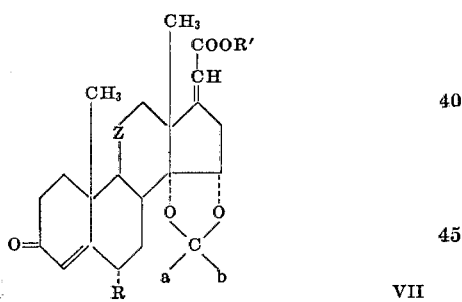

VII wherein R is selected from the group consisting of hydrogen and methyl, R' is lower alkyl, Z is selected from the group consisting of methylene and carbonyl and $a$ and $b$ are selected from the group consisting of lower alkyl of from one through twelve carbon atoms, phenyl and benzyl, which comprises; treating a corresponding compound of the formula

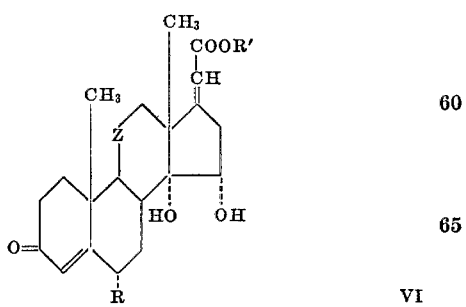

VI wherein R, R' and Z have the same meaning as above, with a ketone of the formula

wherein $a$ and $b$ have the same meaning as above, in the presence of an acid catalyst, to yield a corresponding compound of Formula VII, above.

22. A process in accordance with claim 21 wherein the compound of Formula VI is methyl 3,11-diketo-14α,15α-dihydroxy-4,17(20)-cis - pregnadien - 21-oate and the compound of Formula VII is methyl 3,11-diketo-14α,15α-dihydroxy-4,17(20)-cis - pregnadien - 21 - oate, 14α,15α-acetonide.

23. A process for the production of a compound of claim 1 of the formula

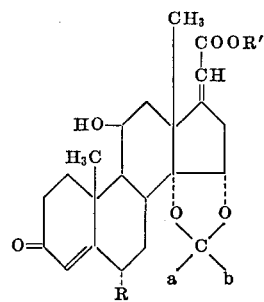

VIII wherein R is selected from the group consisting of hydrogen and methyl, R' is lower alkyl and $a$ and $b$ are selected from the group consisting of alkyl of from one through twelve carbon atoms, phenyl and benzyl, which comprises;

(1) reducing at the 3- and 11- positions a corresponding compound of the formula

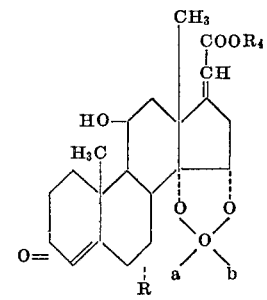

VII wherein R, R', $a$ and $b$ have the same meaning as above, to yield a corresponding compound of the formula

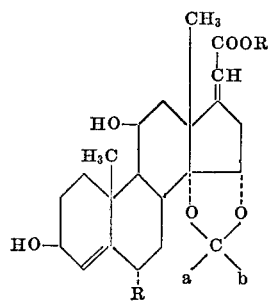

VII' wherein R, R', $a$ and $b$ have the same meaning as above;

(2) oxidizing a thus produced corresponding compound of Formula VII' at the 3β-position to yield a corresponding compound of Formula VIII, above.

24. A process in accordance with claim 23 wherein the compound of Formula VII is methyl 3,11-diketo-14α,15α-dihydroxy-4-17(20)-cis-pregnadien - 21 - oate, 14α,15α-acetonide, the compound of Formula VII' is methyl 3β,11β,14α,15α-tetrahydroxy - 4,17(20) - cis - pregnadien-21-oate, 14α,15α-acetonide and the compound of Formula VIII is methyl 3-keto-11β,14α,15α-trihydroxy-4,17(20)-cis-pregnadien-21-oate, 14α,15α-acetonide.

References Cited

UNITED STATES PATENTS 3,147,248   9/1964   Beal et al. _____ 260—239.55

ELBERT L. ROBERTS, Primary Examiner

ETHEL G. LOVE, Assistant Examiner

U.S. Cl. X.R.

195—51; 260—397.1, 397.3, 397.4, 399.45, 999

PAGE TWO

UNITED STATES PATENT OFFICE
CERTIFICATE OF CORRECTION

Patent No. 3,502,659    Dated March 24, 1970

Inventor(s) Philip F. Beal III and Robert W. Jackson

It is certified that error appears in the above-identified patent and that said Letters Patent are hereby corrected as shown below:

Column 19, line 45, for " 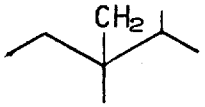 " read -- 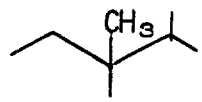 --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents